Patented Mar. 25, 1930

1,751,683

UNITED STATES PATENT OFFICE

HEINRICH CLINGESTEIN, OF COLOGNE-ON-THE-RHINE, GERMANY, AND HARRY W. GRIMMEL, OF NEW YORK, N. Y., ASSIGNORS TO GENERAL ANILINE WORKS, INC., OF NEW YORK, N. Y., A CORPORATION OF DELAWARE

PRIMARY DIAZO DYE DERIVED FROM DIAMINO CARBAZOLES AND ARYLIDES OF UNSULPHONATED HYDROXY CARBOXYLIC ACID

No Drawing. Application filed March 21, 1927, Serial No. 177,208, and in Germany March 24, 1926.

The present invention relates to new primary disazo dyestuffs derived from diamino carbazoles and arylides of unsulphonated hydroxy carboxylic acids.

We have found that exceedingly valuable new azo-dyestuffs, insoluble in water, having most probably the general formula $$R_1-N=N-R-N=N-R_1$$

wherein R represents the residue of an unsulphonated diamino-carbazole compound, and $R_1$ represents an arylide of an unsulphonated hydroxy carboxylic acid, are obtained by coupling the tetrazo-compounds of unsulphonated diamino-carbazole compounds with arylides of unsulphonated hydroxy carboxylic acids such as, for example, arylides of 2.3-hydroxy-naphthoic acid, hydroxy-naphtho-carbazoles, diaceto-acetic acid arylides or the like.

The new dyestuffs thus obtained are, in the dry state, yellowish-brown to violet to blue to black powders, insoluble in water, soluble in concentrated sulfuric acid to the production of solutions which, for the most part, have a bluish coloration. When produced directly on vegetable fibers, these dyestuffs dye very clear yellowish-brown to violet to blue to deep black shades of particular fastness properties; for example, fastness to light and to kier-boiling. These fastness properties especially distinguish our dyestuffs from the dyestuffs obtained by coupling tetrazotized diamino-carbazole-compounds with β-naphthol, which latter dyestuffs already are known.

The most valuable of our dyestuffs are those with deep blue to black shades.

Our dyestuffs produce excellent lakes when mixed with, or precipitated upon, the usual substrates.

In order to further illustrate the invention, the following examples are given, it being understood that the invention is not limited to the particular examples given herein, or to the specific conditions mentioned:

Example 1.—Well boiled out and dried cotton yarn is padded with a solution containing per liter 12 grams of 2.3-hydroxy-naphthoic acid-anilide, 15 ccm. of 34° Bé. caustic soda solution and 20 ccm. of Turkey red oil. It is then well wrung and, without drying, is developed with a solution containing per liter the tetrazo-compound of 5 grams of 2.7-diamino-carbazole made acid by the addition of sodium acetate. After rinsing, drying and soaping the yarn is found to be dyed clear navy blue shades of exceedingly good fastness to kier-boiling and to light. The dyestuff precipitated on the fibre has most probably the formula:

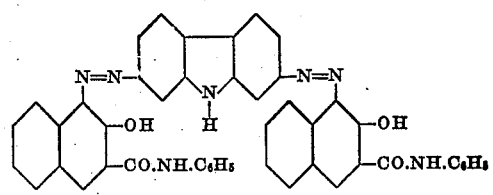

The dyestuff is a blue-black water-insoluble powder which, dissolved in concentrated sulfuric acid, gives a clear blue solution. Upon mixing the sulfuric acid solution with water, blue flakes are produced. In pyridine the dyestuff is soluble with a blue coloration.

By reduction of the dyestuff with stannous chloride and hydrochloric acid, there are obtained 2.7-diamino-carbazole of the formula:

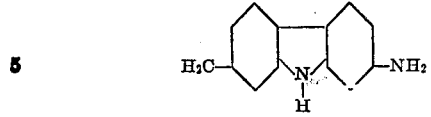

and 1-amino-2-hydroxy-3-naphthoic acid anilid having the formula:

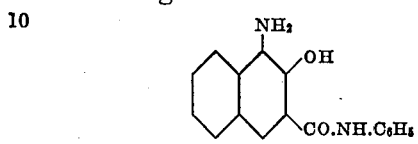

*Example 2.*—Well boiled out and dried cotton yarn is padded with a solution containing per liter 12 grams of 2.3-hydroxy naphthoic acid-alphanaphthalid, 15 ccm. 34° Bé. caustic soda solution and 20 ccm. of Turkey red oil. It is then well wrung out and, without drying, is developed with a solution containing per liter the tetrazo-compound from 5 grams of 3.6-dimethyl-2-7-diaminocarbazole. The yarn after being further treated in the manner described in Example 1, is found to be dyed clear, deep bluish-black shades of exceedingly good fastness to kier boiling and to light.

The dyestuff precipitated on the fibre has most probably the formula:

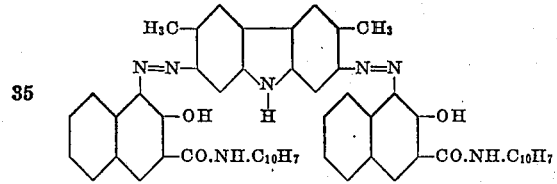

The dyestuff itself is a black powder, insoluble in water but soluble in concentrated sulfuric acid with a bluish coloration. In pyridine it dissolves with a blue coloration. By reduction of the dyestuff with stannous chloride one obtains 2.7-diamino-3.6-dimethyl-carbazole having the formula:

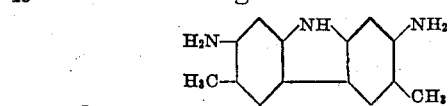

and

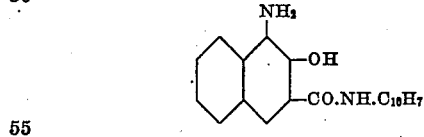

namely 1-amino-2-hydroxy-3-naphthoic acid-alpha-naphthalid.

*Example 3.*—The yarn is well boiled and dried, and is then treated with a solution containing 12 grams of 2.3-hydroxy-naphthoic acid-anilid, 15 ccm. of 34° Bé. caustic soda solution and 20 ccm. Turkey red oil. Without drying, the yarn is developed, after addition of sodium acetate, with a solution containing per liter 5 grams of 3.6-dichloro-2-7-diamino-carbazole. After rinsing, drying and soaping, the yarn is found to be dyed a violet shade.

With other diamino-carbazoles as for example 3.6-diamino-carbazole and 2.3-hydroxy-naphthoic acid arylids, violet shades are obtained of similar depth and clearness.

*Example 4.*—The yarn is well boiled and dried, and then padded with a solution containing per liter 12 grams of 7-hydroxy-naphtho-carbazole, 25 ccm. of 34° Bé. caustic soda solution and 20 ccm. of Turkey red oil. After developing with a solution containing per liter the tetrazo-compound from 5 grams of 2.7-diamino-carbazole, the yarn is found to be dyed deep black of exceedingly good fastness properties.

The dyestuff precipitated on the fibre has most probably the formula:

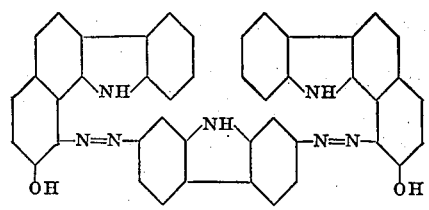

The dyestuff itself is a bluish-black powder insoluble in water but soluble in concentrated sulfuric acid with a blue coloration. By mixing the sulfuric acid solution with water, reddish-blue flakes are obtained. In pyridine it dissolves with a bluish coloration. By reduction with stannous chloride and hydrochloric acid there are obtained 2.7-diamino-carbazole and 8-amino-7-hydroxy-2-1-naphtho-carbazole having the formula:

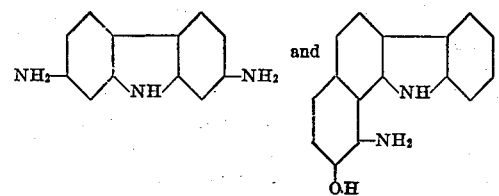

*Example 5.*—The yarn, after being well boiled and dried, is padded with a solution containing per liter 12 grams of diaceto-acetic acid-tolidid, 15 ccm. of 34° Bé. caustic soda solution, and 20 ccm. of Turkey red oil. It is well wrung out and without drying, developed with a solution containing per liter the tetrazo-compound of 5 grams of 2.7-diamino-carbazole made acid by the addition of sodium acetate. After rinsing, drying and soaping the yarn is found to be dyed a strong yellow-brown.

With other diaceto-acetic acid arylids similar colors are obtained.

The dyestuff itself is a brownish powder insoluble in water, but soluble in concentrated sulfuric acid with reddish-blue coloration. In pyridine the dyestuff is soluble with a yellow-brown coloration. The dyestuff has the formula:

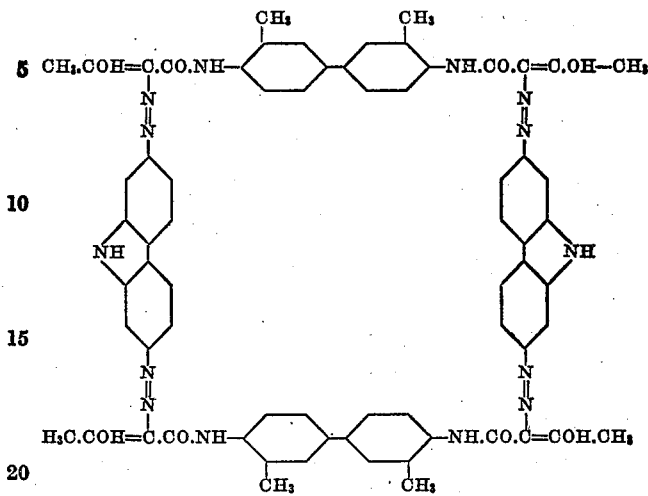

We claim:

1. Process which comprises coupling a tetrazotized unsulphonated diamino-carbazole compound with an arylide of an unsulphonated hydroxy carboxylic acid.

2. Process which comprises coupling a tetrazotized unsulphonated 2.7-diamino-carbazole compound with an arylide of an unsulphonated hydroxy carboxylic acid.

3. Process which comprises coupling a tetrazotized unsulphonated 2.7-diamino-carbazole compound with an unsulphonated arylide of 2.3-hydroxy-naphthoic acid.

4. Process which comprises coupling the tetrazo-compound of unsulphonated 3.6-dimethyl-2.7-diamino-carbazole with 2.3-hydroxy-naphthoic acid-alpha-naphthalid.

5. As new products water-insoluble azo-dyestuffs having the general formula

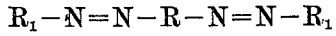

wherein R represents the residue of an unsulphonated diamino-carbazole compound and $R_1$ represents the residue of an arylide of an unsulphonated hydroxy carboxylic acid, which dyestuffs are, in the dry state, yellowish-brown to violet to blue to black powders, insoluble in water, and soluble in concentrated sulfuric acid to the production of solutions which, for the most part, have a bluish coloration.

6. As new products water-insoluble azo-dyestuffs having the general formula

wherein R represents the residue of an unsulphonated 2.7-diamino-carbazole compound and $R_1$ represents the residue of an arylide of an unsulphonated hydroxy carboxylic acid, which dyestuffs are, in the dry state, yellowish-brown to violet to blue to black powders, insoluble in water, and soluble in concentrated sulfuric acid to the production of solutions which, for the most part, have a bluish coloration.

7. As new products water-insoluble azo-dyestuffs having the general formula

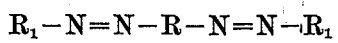

wherein R represents the residue of an unsulphonated 2.7-diamino-carbazole compound and $R_1$ represents the residue of a 2.3-hydroxy-naphthoic acid arylide which dyestuffs are, in the dry state, yellowish-brown to violet to blue to black powders, insoluble in water, and soluble in concentrated sulfuric acid to the production of solutions which, for the most part, have a bluish coloration.

8. As a new product a water-insoluble azo-dyestuff containing the residue of unsulphonated 3.6-dimethyl-2.7-diamino-carbazole and the residue of an unsulphonated 2.3-hydroxy-naphthoic acid-alpha-naphthalid having most probably the formula:

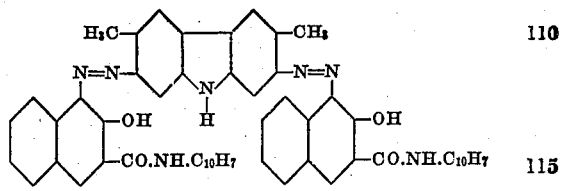

9. The material dyed with the dyestuff defined in claim 5.

10. The material dyed with the dyestuff defined in claim 6.

11. The material dyed with the dyestuff defined in claim 7.

12. The material dyed with the dyestuff defined in claim 8.

In testimony whereof, I affix my signature.
HARRY W. GRIMMEL.

In testimony whereof, I affix my signature.
HEINRICH CLINGESTEIN.

Certificate of Correction

Patent No. 1,751,683.                                                 Granted March 25, 1930, to

HEINRICH CLINGESTEIN ET AL.

It is hereby certified that error appears in the printed specification of the above numbered patent requiring correction as follows: Page 2, line 5, in the formula, for "$H_2C$" read $H_2N$; and that the said Letters Patent should be read with this correction therein that the same may conform to the record of the case in the Patent Office.

Signed and sealed this 22d day of April, A. D. 1930.

[SEAL.]

M. J. MOORE,
*Acting Commissioner of Patents.*